United States Patent
Barzelay et al.

(10) Patent No.: US 11,157,744 B2
(45) Date of Patent: Oct. 26, 2021

(54) AUTOMATED DETECTION AND APPROXIMATION OF OBJECTS IN VIDEO

(71) Applicant: International Business Machines Corporation, Armonk, NY (US)

(72) Inventors: Udi Barzelay, Haifa (IL); Tal Hakim, Haifa (IL); Daniel Nechemia Rotman, Haifa (IL); Dror Porat, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 16/742,944

(22) Filed: Jan. 15, 2020

(65) Prior Publication Data
US 2021/0216780 A1    Jul. 15, 2021

(51) Int. Cl.
*G06K 9/00* (2006.01)
*G06F 16/783* (2019.01)
(Continued)

(52) U.S. Cl.
CPC ..... *G06K 9/00744* (2013.01); *G06F 16/7837* (2019.01); *G06K 9/6256* (2013.01);
(Continued)

(58) Field of Classification Search
CPC ............. G06K 9/00744; G06K 9/6256; G06K 9/6262; G06T 7/70; G06T 2207/10016; G06F 16/7837; G06N 3/04; G06N 3/08
See application file for complete search history.

(56) References Cited

U.S. PATENT DOCUMENTS

| | | |
|---|---|---|
| 10,051,253 B1 | 8/2018 | Monastyrshyn |
| 2001/0048753 A1* | 12/2001 | Lee .......................... G06T 7/155 |
| | | 382/103 |

(Continued)

FOREIGN PATENT DOCUMENTS

| | | |
|---|---|---|
| CN | 104217225 A | 12/2014 |
| CN | 106326916 A | 1/2017 |
| CN | 108710885 A | 10/2018 |

OTHER PUBLICATIONS

D. Held et al., "Learning to Track at 100 FPS with Deep Regression Networks," in Proceedings of the European Conference Computer Vision, 2016.
H. Luo et al., "Detect or Track: Towards Cost-Effective Video Object Detection/Tracking," in The AAAI Conference on Artificial Intelligence, vol. 33, No. 1 (2019), pp. 8803-8810, Jul. 2019.
(Continued)

*Primary Examiner* — Xin Jia
(74) *Attorney, Agent, or Firm* — Dvir Gassner

(57) ABSTRACT

Automated detection and approximation of objects in a video, including: (a) sampling a provided digital video, to obtain a set of sampled frames; (b) applying an object detection algorithm to the sampled frames, to detect objects appearing in the sampled frames; (c) based on the detections in the sampled frames, applying an object approximation algorithm to each sequence of frames that lie between the sampled frames, to approximately detect objects appearing in each of the sequences; (d) applying a trained regression model to each of the sequences, to estimate a quality of the approximate detection of objects in the respective sequence; (e) applying the object detection algorithm to one or more frames in those of the sequences whose quality of the approximate detection is below a threshold, to detect objects appearing in those frames.

16 Claims, 5 Drawing Sheets

(51) Int. Cl.
*G06N 3/08* (2006.01)
*G06K 9/62* (2006.01)
*G06T 7/70* (2017.01)
*G06N 3/04* (2006.01)

(52) U.S. Cl.
CPC ............. *G06K 9/6262* (2013.01); *G06N 3/04* (2013.01); *G06N 3/08* (2013.01); *G06T 7/70* (2017.01); *G06T 2207/10016* (2013.01)

(56) References Cited

U.S. PATENT DOCUMENTS

2019/0164010 A1* 5/2019 Ma .................... G06K 9/00711
2019/0222776 A1* 7/2019 Carter ................ G06K 9/00369
2020/0404173 A1* 12/2020 Li ...................... H04N 5/23229

OTHER PUBLICATIONS

H. Nam et al., "Learning Multi-Domain Convolutional Neural Networks for Visual Tracking," in Proceedings of The 2016 IEEE Conference on Computer Vision and Pattern Recognition (CVPR), 2016.

K. Chen et al., "Optimizing Video Object Detection via a Scale-Time Lattice," in Proceeding of the IEEE Conference on Computer Vision and Pattern Recognition (CVPR), pp. 7814-7823, Jun. 2018.

X. Zhu et al., "Deep Feature Flow for Video Recognition," in Proceedings of IEEE Conference on Computer Vision and Pattern Recognition (CVPR), Jul. 2017.

X. Zhu et al., "Towards High Performance Video Object Detection," in Proceedings of The 2018 IEEE Conference on Computer Vision and Pattern Recognition (CVPR), pp. 7210-7218, 2018.

* cited by examiner

AUTOMATED DETECTION AND APPROXIMATION OF OBJECTS IN VIDEO

BACKGROUND

The invention relates to the field of automated object detection and approximation.

Detection of moving objects is a computer technology that involves detecting instances of semantic objects, such as humans, animals, plants, and various inanimate objects, in digital videos. It is an essential part of many video understanding tasks, such as visual surveillance, autonomous navigation, and video captioning.

Detecting objects in videos is resource-intensive, due to the vast amount of frames in a typical video. Therefore, many existing techniques combine the use of object detection algorithms with faster object approximation algorithms, such as those that use tracking, interpolation, extrapolation, or machine-learning techniques; an object detector is only applied to a small subset of the video's frames, such as frames uniformly sampled along the video, and the location of the detected objects in the frames lying between the sampled ones is then just approximated. Object approximators are considerably faster than detectors, but are inherently less accurate. Accordingly, when the two are used together, there is an inherent tradeoff between speed and accuracy.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a method comprising: (a) sampling a provided digital video, to obtain a set of sampled frames; (b) applying an object detection algorithm to the sampled frames, to detect objects appearing in the sampled frames; (c) based on the detections in the sampled frames, applying an object approximation algorithm to each sequence of frames that lie between the sampled frames, to approximately detect objects appearing in each of the sequences; (d) applying a trained regression model to each of the sequences, to estimate a quality of the approximate detection of objects in the respective sequence by the object approximation algorithm; (e) applying the object detection algorithm to one or more frames in those of the sequences whose quality of the approximate detection is below a threshold, to detect objects appearing in those frames; (f) defining multiple sub-sequences that are different from the sequences, wherein each of the multiple sub-sequences comprises frames that lie between every adjacent pair of frames to which the object detection algorithm has been applied in steps (b) and (e); and (g) re-applying the object approximation algorithm to each of the multiple sub-sequences.

Another embodiment relates to a system comprising: (i) at least one hardware processor; and (ii) a non-transitory computer-readable storage medium having program code embodied therewith, the program code executable by said at least one hardware processor to: (a) sample a provided digital video, to obtain a set of sampled frames; (b) apply an object detection algorithm to the sampled frames, to detect objects appearing in the sampled frames; (c) based on the detections in the sampled frames, apply an object approximation algorithm to each sequence of frames that lie between the sampled frames, to approximately detect objects appearing in each of the sequences; (d) apply a trained regression model to each of the sequences, to estimate a quality of the approximate detection of objects in the respective sequence by the object approximation algorithm; (e) apply the object detection algorithm to one or more frames in those of the sequences whose quality of the approximate detection is below a threshold, to detect objects appearing in those frames; (f) define multiple sub-sequences that are different from the sequences, wherein each of the multiple sub-sequences comprises frames that lie between every adjacent pair of frames to which the object detection algorithm has been applied in steps (b) and (e); and (g) re-apply the object approximation algorithm to each of the multiple sub-sequences.

A further embodiment relates to a computer program product comprising a non-transitory computer-readable storage medium having program code embodied therewith, the program code executable by at least one hardware processor to: (a) sample a provided digital video, to obtain a set of sampled frames; (b) apply an object detection algorithm to the sampled frames, to detect objects appearing in the sampled frames; (c) based on the detections in the sampled frames, apply an object approximation algorithm to each sequence of frames that lie between the sampled frames, to approximately detect objects appearing in each of the sequences; (d) apply a trained regression model to each of the sequences, to estimate a quality of the approximate detection of objects in the respective sequence by the object approximation algorithm; (e) apply the object detection algorithm to one or more frames in those of the sequences whose quality of the approximate detection is below a threshold, to detect objects appearing in those frames; (f) define multiple sub-sequences that are different from the sequences, wherein each of the multiple sub-sequences comprises frames that lie between every adjacent pair of frames to which the object detection algorithm has been applied in steps (b) and (e); and (g) re-apply the object approximation algorithm to each of the multiple sub-sequences.

In some embodiments, the method further comprises, or the program code is further executable for, obtaining a training set of digital videos; for each of the digital videos of the training set: (a) applying the object detection algorithm to all frames of the respective digital video, to detect objects appearing in the frames of the respective digital video, (b) sampling the respective digital video, to obtain a set of sampled frames of the respective digital video, (c) applying the object approximation algorithm to frames of the respective digital video that lie between the sampled frames of the respective digital video, to approximately detect objects appearing in those frames that lie between the sampled frames of the respective digital video, and (d) for each of the frames that lie between the sampled frames of the respective digital video, comparing the approximate detection by the object approximation algorithm and the detection by the object detection algorithm, to estimate an accuracy of the approximate detection by the object approximation algorithm, (e) extracting features from frames of the respective digital video; and training the regression model based on the estimated accuracy and the extracted features.

In some embodiments, the provided digital video and the digital videos of the training set are of a same genre.

In some embodiments, the threshold is determined according to a budget of computing resources that is available to operate the object detection algorithm.

In some embodiments, the object approximation algorithm is selected from the group consisting of: a tracking-based algorithm, an interpolation-based algorithm, an extrapolation-based algorithm, a duplication-based algorithm, and an Artificial Neural Network (ANN)-based algorithm.

In some embodiments, the method is executed on at least one hardware processor.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
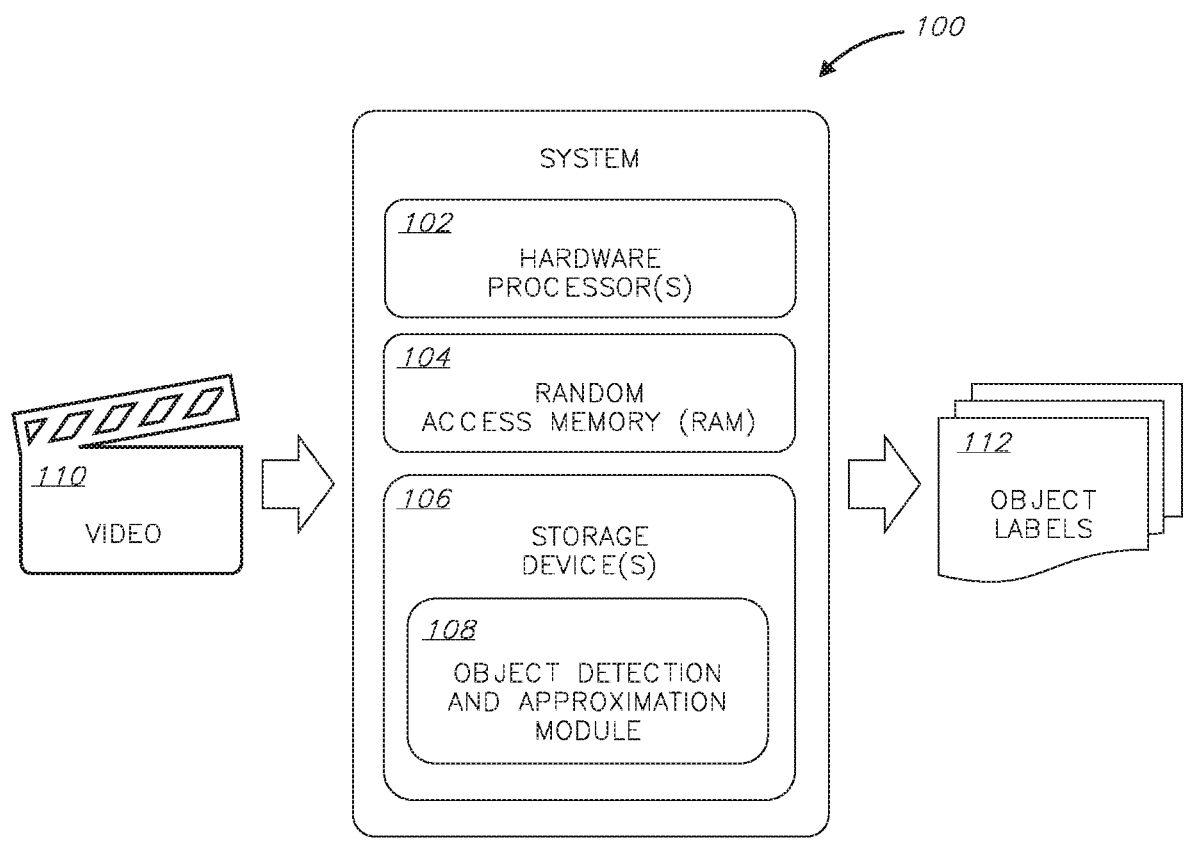
FIG. 1 is a block diagram of an exemplary system for automated detection and approximation of objects in a video, according to an embodiment.

Disclosed herein is a method, system, and computer program product for automated detection and approximation of objects in a video, in which an object detection algorithm is intelligently applied only to those frames of the video whose object approximation quality is deemed low. An advantageous regression model is used to estimate the quality of approximate detection of objects by the object approximation algorithm, so that the more computationally-intensive object detection algorithm can be applied only where it is most needed—frames whose quality of approximate detection of objects was poor. Overall, this technique allows for advantageous balancing of the well-known speed/accuracy tradeoff, and provides for relatively accurate object detection in a relatively short time. In addition, given a fixed budget for computational resources (e.g., a maximum amount of time a GPU can be used), the present technique enables spending the budget where it matters the most— those frames for which the approximate detection performed most poorly.

The regression model may be trained in a self-supervised, setting-adaptive manner, using a training set of unlabeled videos that are of the same setting (e.g., videography style, object types contained in the video, genre, etc.) as the video to which the regression model is to be later applied. For example, one regression model may be trained on the basis of nature videos, another based on stationary surveillance videos, and yet another based on television news broadcasts.

The self-supervised training may be performed as follows: for each video of the training set, an object detection algorithm may be applied to all frames, to obtain a ground-truth detection of all objects in the various frames. Then, the video may be sampled, to obtain a set of sampled frames that are, for example, uniformly spread along the video. The objects detected in these frames in the previous step will then be used for the following step: An object approximation algorithm is applied to frames of video that lie between the sampled frames, to approximately detect objects appearing in those frames. Next, the approximate detections by the object approximation algorithm are compared with the ground-truth detections by the object approximation algorithm, to estimate the accuracy of the approximate detections. In addition, various features are extracted from the video, because some of these features might explain why lower or higher accuracy of approximate detections was achieved. Finally, the regression model may be trained based on the estimated accuracy and the extracted features, so that the trained model learns to associate certain features with certain degrees of accuracy of the approximate object detections.

The term "object detection algorithm," as referred to herein, may relate to any algorithm that is configured to detect semantic objects in a frame of video, not by relying on some previous object detection in an adjacent frame, but rather by analyzing only the pertinent frame.

Such object detection algorithm may be based on a machine learning approach, such as the Viola-Jones object detection framework (P. Viola, M. Jones, "Rapid Object Detection Using a Boosted Cascade of Simple Features," in Proc. CVPR, February 2001; and P. Viola, M. Jones, "Robust Real-time Object Detection," in International Journal of Computer Vision, 2001), the Scale-Invariant Feature Transform (SIFT) algorithm (D. Lowe, "Object Recognition From Local Scale-Invariant Features," in Proceedings of the International Conference on Computer Vision, 1999), or the Speeded-Up Robust Features (SURF) algorithm (H. Bay et al., "Speeded-Up Robust Features (SURF)," in Proceeding of the European Conference on Computer Vision, 2006), to name a few examples.

Alternatively, such object detection algorithm may be based on a deep learning approach, such as the You Only Look Once (YOLO) algorithm (J. Redmon, A. Farhadi, "YOLOv3: An Incremental Improvement,", arXiv: 1804.02767v1 Apr. 8, 2018), the Single Shot MultiBox Detector (SSD) algorithm (E. Liu, "SSD: Single Shot Multibox Detector," in European Conference on Computer Vision, Lecture Notes in Computer Science, October 2016), or the Faster R-CNN algorithm (Sh. Ren, et al., "Faster R-CNN: Towards Real-Time Object Detection with Region Proposal Networks," in in IEEE Transactions on Pattern Analysis and Machine Intelligence, June 2015), to name a few examples. Those of skill in the art will recognize additional object detection algorithms, in existence now or to be developed in the future, suitable for use within the framework of the present invention. When an object detection algorithm is applied to a video frame, the output is typically in the form of a label of each detected object (e.g., "person," "tree,", "car," "dog") and coordinates denoting the location of the object in the frame (typically, the coordinates of a rectangle are given, which are essentially a bounding box around the object).

The term "object approximation algorithm," as referred to herein, may relate to any algorithm that is configured to estimate the location of a moving object, previously detected by an object detection algorithm, along multiple consecutive frames of a video. An object approximation algorithm does not semantically identify an object appearing in each of these frames, but rather just provides the changing coordinates of the object (whatever it may be) as it changes location in the frames along the video. Existing object approximation algorithm are based on various approaches, such as tracking the motion of a previously-detected object (e.g., using optical flow or other techniques); interpolating the location of an object between a pair of frames in which it was previously detected; extrapolating the location of an object from an initial frame in which it was previously detected, assuming that it keeps moving in the same direction and speed along subsequent frames; duplicating, without change, the location of an object in an initial frame in which it was previously detected, to subsequent frames; or using a fast-performing ANN (Artificial Neural Network), such as a ResNet, to estimate the location of an object between a pair of frames in which it was previously-detected. Examples of existing object approximation algorithms include GOTURN (D. Held et al., "Learning to Track at 100 FPS with Deep Regression Networks," in Proceedings of the European Conference Computer Vision, 2016), MDNet (H. Nam et al., "Learning Multi-Domain Convolutional Neural Networks for Visual Tracking," The IEEE Conference on Computer Vision and Pattern Recognition (CVPR), 2016), and Scale-Time Lattice (K. Chen et al., "Optimizing Video Object Detection via a Scale-Time Lattice," in Proceeding of the IEEE Conference on Computer Vision and Pattern Recognition (CVPR), pages 7814-7823, June 2018). Those of skill in the art will recognize additional object approximation algorithms, in existence now or to be developed in the future, suitable for use within the framework of the present invention. When an object approximation algorithm is applied to video frames, the output is typically in the form of a label identifying each detected object and coordinates denoting the location of the object in each of the frames (typically, the coordinates of a rectangle are given, which are essentially a bounding box around the object).

Typically, when a combination of object detection and approximation algorithms is applied to a video, the object detection algorithm is applied to uniformly-sampled frames of the video (i.e. every $N^{th}$ frame), and the object approximation algorithm is applied to frames lying between those uniformly-sampled frames. The labels produced by the object detection algorithms are then expanded to objects whose location was approximated by the object approximation algorithm, so that the end result is object labels and coordinates along the entire video.

Reference is now made to FIG. 1, which shows a block diagram of an exemplary system 100 for automated detection and approximation of objects in a video, according to an embodiment. System 100 may be used by end-users wishing to detect objects in videos. System 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as an object detection and approximation module 108. The software components may include an operating system having various software components and/or drivers for controlling and managing general system tasks (e.g., memory management, storage device control, power management, etc.), and facilitating communication between various hardware and software components.

System 100 may operate by loading instructions of object detection and approximation module 108 into RAM 104 as they are being executed by processor(s) 102. The instructions of object detection and approximation module 108 may cause system 100 to receive a digital video (referred to herein simply as "video") 110, process it, and output object labels 112 for the video.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, etc. (not shown). Components of system 100 may be co-located or distributed (e.g., in a distributed computing architecture).

Figure 2:
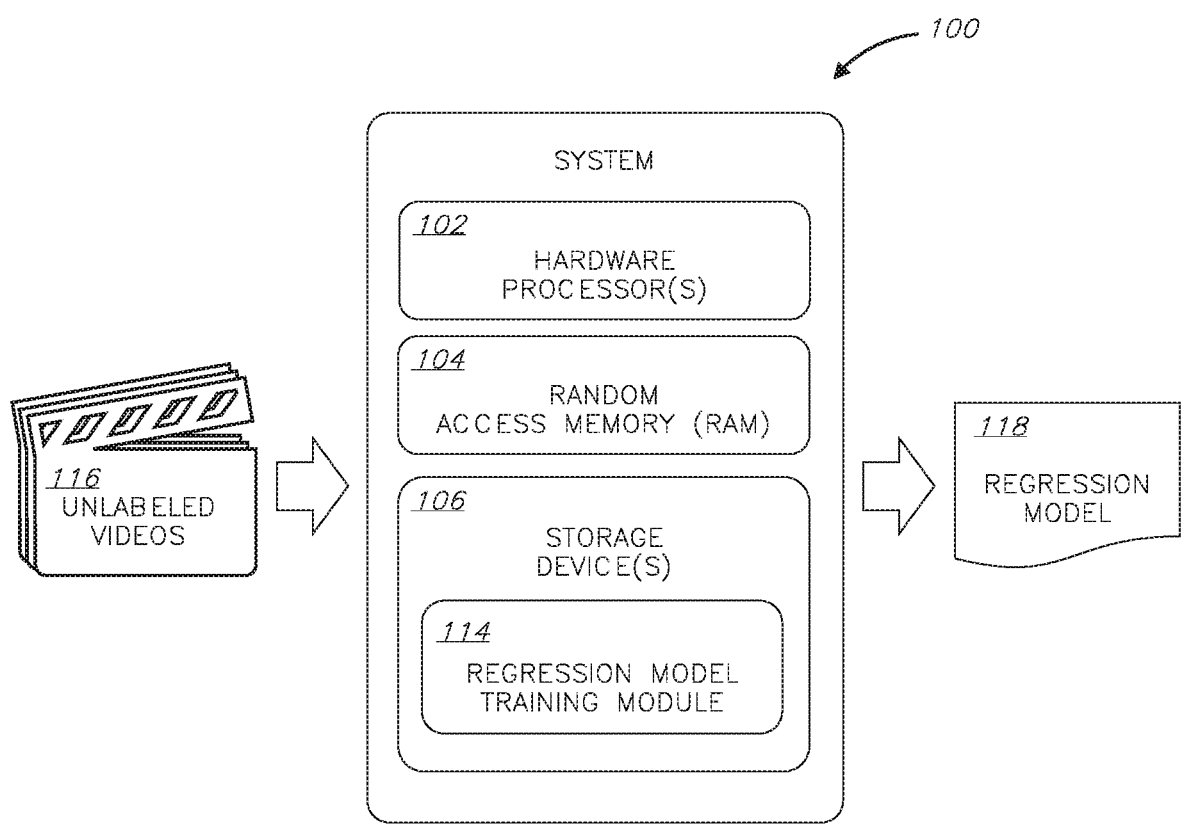
FIG. 2 is a block diagram of an exemplary system for training a regression model, according to an embodiment.

A system similar to that of FIG. 1 may be used for training a regression model used by object detection and approximation module 108. That similar system is shown in FIG. 2, which illustrates a system 200 having essentially the same components as FIG. 1, except for a regression model training module 114 instead of object detection and approximation module 108. For reasons of brevity, the description of the other components of system 200 is not repeated here. The instructions of regression model training module 114 may cause system 200 to receive a training set of unlabeled videos 116, process them, and output a trained regression model 118.

The instructions of object detection and approximation module 108 (FIG. 1) and of regression model training module 114 (FIG. 2) are now discussed with reference to the flowcharts of FIGS. 3 and 4, respectively, which illustrate methods 300 and 400 for object detection and approximation and for training a regression model, in accordance with embodiments.

Steps of methods 300 and 400 may either be performed in the order they are presented or in a different order (or even in parallel), as long as the order allows for a necessary input to a certain step to be obtained from an output of an earlier step. In addition, the steps of methods 300 and 400 are performed automatically (e.g., by systems 100 or 200 of FIG. 1 or 2, respectively), unless specifically stated otherwise.

Figure 3:
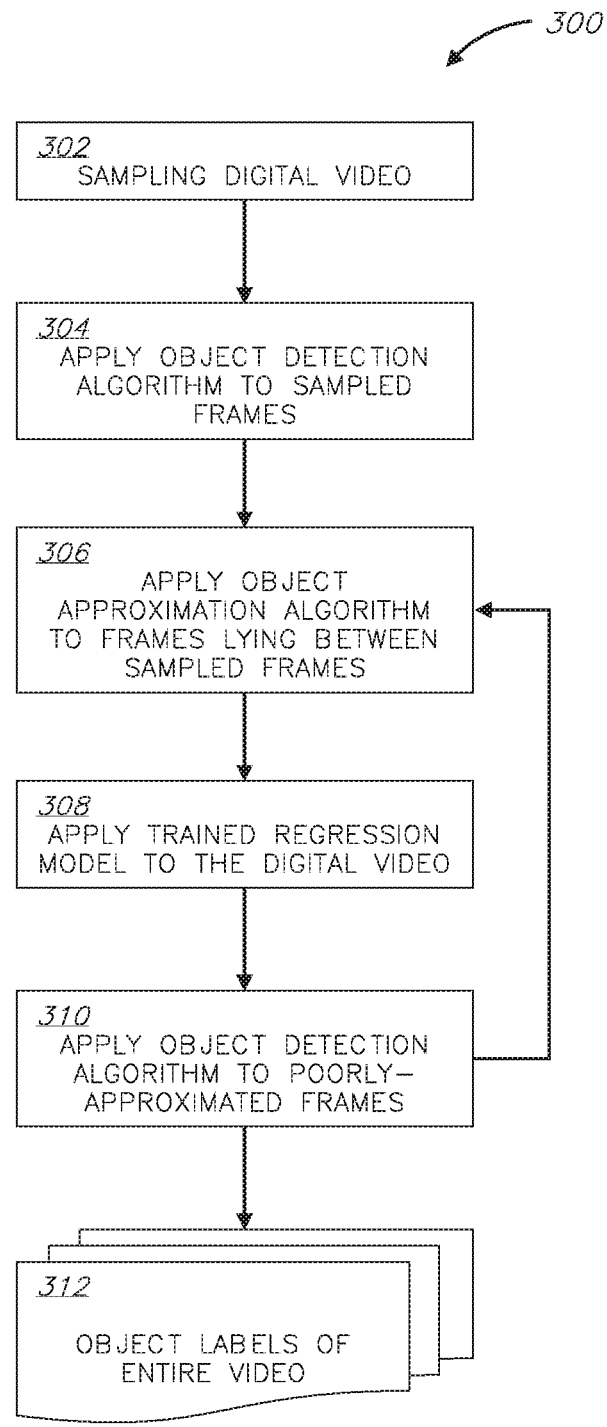
FIG. 3 is a flowchart of a method for automated detection and approximation of objects in a video, according to an embodiment.
Figure 4:
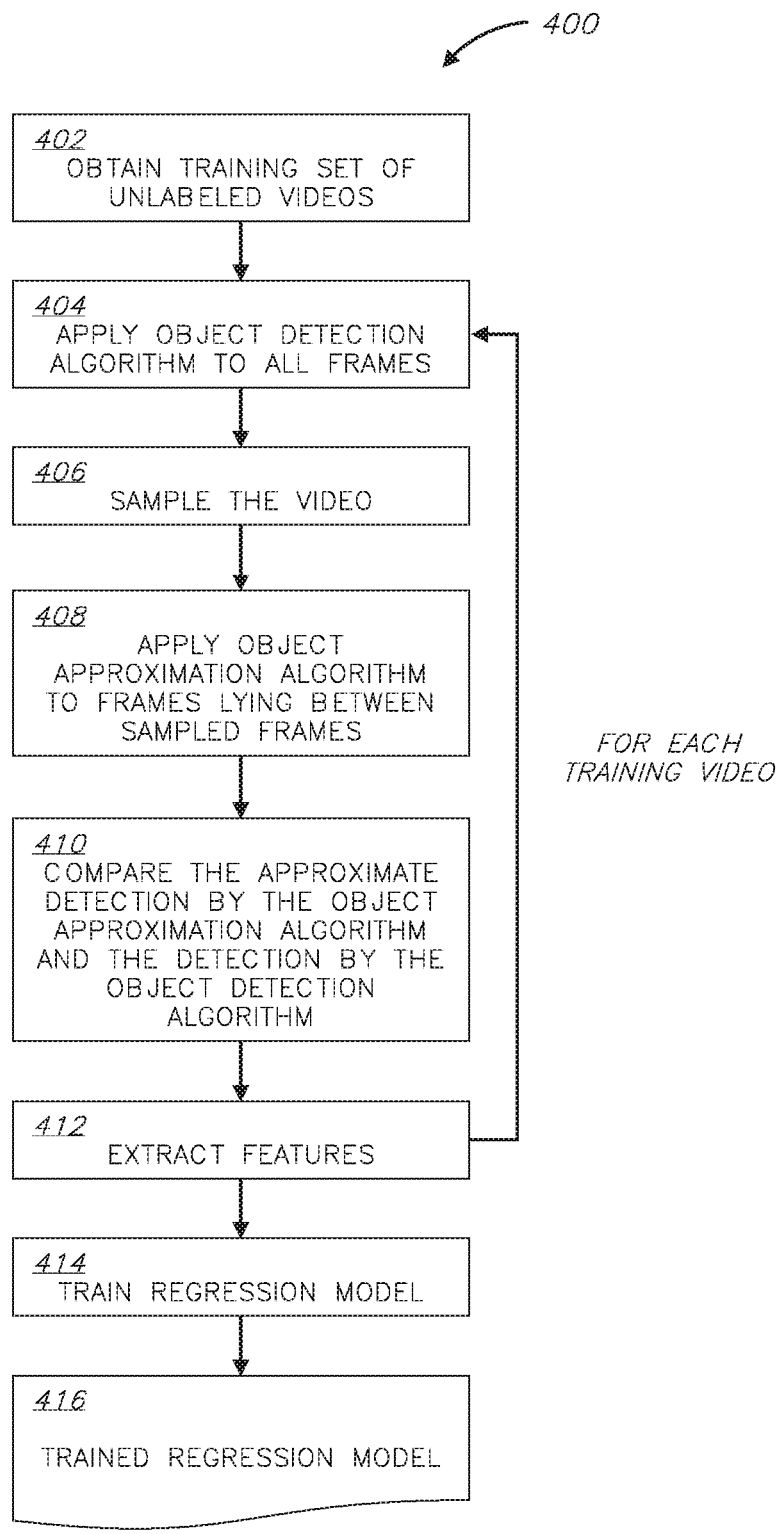
FIG. 4 is a flowchart of a method for training a regression model, according to an embodiment.

With reference to FIG. 3, a step 302 may include sampling of a digital video provided as input, to obtain a set of sampled frames. The sampling may be made uniformly. For example, every $10^{th}$, $30^{th}$, $60^{th}$, or $120^{th}$ frame is sampled. Every integer value in between these exemplary values or beyond them is intended to be an embodiment of the present invention.

In a step 304, an object detection algorithm may be applied to the sampled frames, to detect objects appearing in the sampled frames. The object detection algorithm may provide, as output, labels of the detected objects (e.g., "person," "tree,", "car," "dog"), and coordinates (optionally rectangular coordinates) of where that object appears in the respective frame.

In a step 306, based on the detections in the sampled frames, an object approximation algorithm may be applied to frames that lie between the sampled frames. For example, if every $10^{th}$ frame was sampled in step 302, then object approximation may be performed for each sequence of 9 frames that lies between the sampled frames. The object approximation algorithm may approximately detect objects appearing those frames, namely—it may allow expanding the results of the object detection algorithm to nearby frames, albeit with reduced accuracy. For example, if a cat and a dog were detected in frame nos. 10 and 20 by the object detection algorithm, approximate detection of these cat and dog may be made by the object approximation algorithm in frames 11 through 19, but that approximate detection is not necessarily accurate; the animals may have crossed paths somewhere along these frames, causing the object approximation algorithm to confuse between the two. Accordingly, the output of the object approximation algorithm for frame no. 19 may be the opposite labels for the cat and the dog, on any other type of mistaken labeling.

Figure 5:
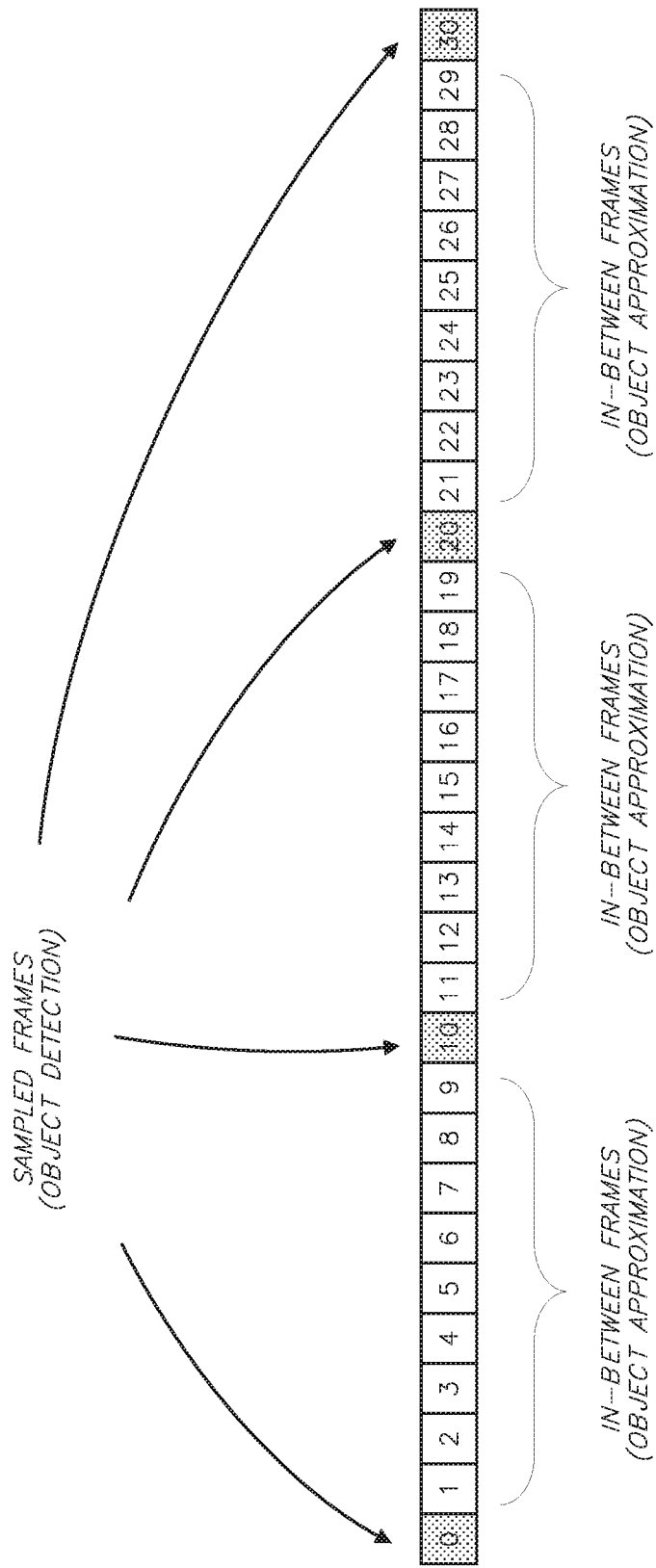
FIG. 5 shows an exemplary video timeline in which every $10^{th}$ frame is sampled and undergoes object detection, and the frames lying in-between the sampled frames undergo object approximation, according to an embodiment.

Interim reference is made to FIG. 5, which shows an exemplary video timeline, illustrating steps 302-306: every $10^{th}$ frame is sampled and undergoes object detection, and the frames lying in-between the sampled frames undergo object approximation.

Returning to FIG. 3, in a step 308, in order to estimate the quality (namely, the accuracy) of the approximate detection of objects by the object approximation algorithm, a trained regression model may be applied, separately, to each sequence of frames lying between a pair of sampled frames. That regression model may output a quality score, such as a numerical score, for each such sequence. A relatively low score denotes that the accuracy of the approximate detection of objects by the object approximation algorithm is likely to be relatively low, and vice versa. The regression model can make that estimation because it was trained to identify features in frames of the video which are good indicators of the quality of approximate detections in those frames. The regression model was optionally also trained on videos in the same setting (e.g., videography style, object types contained in the video, genre, etc.) as the present video, so it is adept at identifying specific predictive features of that particular setting.

In a step 310, in order to improve the approximate object detections in frame sequences where having a low approximation quality (e.g., below a predefined threshold), the object detection algorithm may be applied to one or more frames of such low-quality sequences (or only some of the sequences, according to available computing budget—see discussion below). For example, the object detection algorithm may be applied to the middle frame of each such sequence (e.g. to frame 5 in FIG. 5), or to multiple equidistant frames (e.g., to frames 3 and 6, or 3 and 7, or 4 and 7, of FIG. 5, that split the sequence into equal (or approximately equal) sub-sequences—according to available computing budget. This results in slower but far more accurate detections in those frames. The labels of the detected objects then replace the labels of the approximated objects for those frames, which can be discarded. Subsequently, the object approximation algorithm may be re-applied (step 306) to frames of the new sub-sequences, based on the newly-available object detections at the borders of these sub-sequences. The re-applied object approximation algorithm is expected to provide better object approximations than before, because it is applied to a shorter sequence.

Optionally, method 300 is executed in a budget-aware manner, and the abovementioned threshold is budget-dependent. The budget may comprise, for instance, of a maximum number of frames per unit of time or as a percentage of total frames, for which an object detection algorithm can be applied. By way of example, a certain budget may define that an object detection algorithm can be applied to up to 15% of the frames of the video. Then, based on such budget, steps 302 and 304 may include sampling (e.g., uniformly) and object detection in 10% of the frames of the video, leaving another 5% for a second pass of the object detection algorithm. The remaining budget (5%) can be intelligently allocated, in step 310, to the sequences which had the lowest quality scores estimated for them in step 308. For example, if 10 sequences were scored 1 . . . 10, respectively, and the remaining 5% budget is enough for a second pass on just 5 frames, then the threshold may be defined as score 5, and one frame per sequence which had a score of 5 or less (namely, sequences 1-5) may be subject to application of the object approximation algorithm. Of course, the division of the 15% budget into two thirds (for sampling and first pass of object detection) and a third (for the second pass of object detection), is given here only as an example. The skilled artisan, when employing method 300, can divide the budget as she sees fit between the first and second passes of the object detection algorithm.

The end result of method 300 is a set of object labels 312 for the entire video, denoting both the semantic names of the objects appearing in each frame as well as their location in the frames. An optional output is a re-rendered version of the video, in which bounding boxes are displayed around the identified objects, along with their semantic names.

The training of the regression model applied in step 308 is now described with reference to method 400 of FIG. 4.

In a step 402, a training set of videos may be obtained. These videos are unlabeled, namely—they do not need to be provided with labels of objects detected in them.

Then, steps 404-412 are performed for each of the videos in the training set:

A step 404 includes applying the object detection algorithm to all frames of the respective digital video, to detect objects appearing therein. Optionally, this is the same object detection algorithm that will later be used, in method 300, on the video where detection of objects is desired. Step 404 results in object labels and object locations coordinates for all frames, that will serve as the ground-truth detection for the respective training video.

In a step 406, the respective digital video may be sampled (e.g., uniformly), to obtain a set of sampled frames. To enhance the robustness of the resulting regression model, each of the training digital videos may be sampled randomly, subject to some constraint; for example, the constraint may be a sampling rate of once every 3 frames to once every 120 frames (these values are merely given as an example), and a pseudorandom algorithm will independently decide on a sampling rate, within that range, for each training video. This ensures that training is performed on the basis of many possible sampling regimes, to make the regression model adept at handling videos sampled differently.

In a step 408, the object approximation algorithm may be applied to frames of the respective training video that lie between the sampled frames. Optionally, this is the same object approximation algorithm that will later be used, in method 300, on the video where detection of objects is desired. Step 408 results in approximate detection of objects appearing in those frames that lie between the sampled frames.

In a step 410, the approximate detection by the object approximation algorithm and the detection by the object detection algorithm may be compared for each of the frames that lie between the sampled frames of the respective training video. This comparison results in an estimation of the accuracy of the approximate detection by the object approximation algorithm relative to the ground-truth. Because the regression model has to be able to score an entire frame sequence as a whole (see step 308 of FIG. 3), the comparison results for all frames of a certain sequence (of frames lying between a pair of sampled frames) may be averaged, to yield an estimated accuracy score for the entire sequence. For example, the comparison may be on the basis of measures known in the art, such as bounding box IoU (Intersection over Union), bag-of-words IoU (for objects which are texts), etc.

In a step 412, features may be extracted from frames of the training video. At least some of the extracted frames may be responsible for lower or higher quality of the approximate detections, and hence their importance in training the regression model. The extraction of features may be supervised or unsupervised. If supervised, it may be directed to features such as:

One, diversity of the color histogram of frames of each sequence that lies between a pair of sampled frames. Low diversity is typically an indicator for less motion in the sequence, which means that approximation is likely to be more accurate, and vice versa.

Two, agreement on detected object types between the object detection algorithm (for one or both frames of an adjacent pair of sampled frames) and object approximation algorithm (for each of the frames lying between that pair); for example, if the two sampled frames had four dogs, two cats, a person and a penguin detected in them, and exactly the same objects were approximated and each of the frames lying between the sampled frames (regardless of the coordinates of the detections, which have likely changed from frame to frame), then the agreement can be said to be 1 (100%) under the Jaccard similarity index. Conversely, if there is no overlap at all between these detections and approximation, the agreement is said to be 0 (0%). Of course, this agreement level may be averaged for each sequence of frames that lie between a pair of sampled frames, so that a single feature per the entire sequence is available.

Third, agreement on detected object coordinates by the object detection and approximation algorithms, for each frame (averaged over each entire sequence of frames lying between a pair of sampled frames, in order to produce one feature per such sequence). This feature may be computed by any algorithm known in the art for matching a certain object's bounding box between two available detection versions—one by the object approximation algorithm and the other by the object approximation algorithm Once objects in each frame are matched, their bounding boxes IoU may be calculated, as a measure of their agreement. The calculated IOUs may be averaged over each sequence, to produce one feature per such sequence.

These features are merely given as examples to one or more features that can be extracted in step 412. Those of skill in the art will recognize other feature types that may be linked to object approximation quality, and thus can or should be used in step 412.

In a step 414, which is executed after steps 404-412 have completed for all the training videos, the regression model is trained based on (a) the estimated accuracy of the approximate detection by the object approximation algorithm relative to the ground-truth, in step 410, and (b) the features extracted in step 412. In the training, the regression model learns to associate certain features with certain degrees of accuracy of the approximate object detections. When the trained regression model 416 is applied to a video, such as in step 308 of method 300, it will know to associate certain features it detects in the videos to certain levels of estimates quality of the approximate detections.

Experimental Results

The present object detection and approximation method was tested on a series of videos of different genres. For object detection, the Faster R-CNN algorithm, YOLOv3 algorithm, and NST algorithm (Natural Scene Text recognition tool by IBM Corporation, commercially available as part of the Watson Visual Recognition solution) were used for different ones of the videos. Object approximation was performed by the KCF (Kernelized Correlation Filter) algorithm, which is available as part of the Open CV open source computer vision and machine learning software library, online at https://opencv.org (last viewed Nov. 19, 2019).

The regression model managed to accurately indicate the quality of the object approximation in different areas of the videos, and then to direct a second pass of the object detection algorithm to the most poorly-approximated frames. Satisfying results of labeling these videos with object labels, as confirmed by human reviewers, were obtained with application of the object approximation algorithms (in both the first and second passes) to only about 15% of the frames of each video.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    (a) sampling a provided digital video, to obtain a set of sampled frames;
    (b) applying an object detection algorithm to the sampled frames, to detect objects appearing in the sampled frames;
    (c) based on the detections in the sampled frames, applying an object approximation algorithm to each sequence of frames that lie between the sampled frames, to approximately detect objects appearing in each of the sequences;
    (d) applying a trained regression model to each of the sequences, to estimate a quality of the approximate detection of objects in the respective sequence by the object approximation algorithm;
    (e) applying the object detection algorithm to one or more frames in those of the sequences whose quality of the approximate detection is below a threshold, to detect objects appearing in those frames;
    (f) defining multiple sub-sequences that are different from the sequences, wherein each of the multiple sub-sequences comprises frames that lie between every adjacent pair of frames to which the object detection algorithm has been applied in steps (b) and (e); and
    (g) re-applying the object approximation algorithm to each of the multiple sub-sequences.

2. The method according to claim 1, further comprising:
obtaining a training set of digital videos;
for each of the digital videos of the training set:
applying the object detection algorithm to all frames of the respective digital video, to detect objects appearing in the frames of the respective digital video,
sampling the respective digital video, to obtain a set of sampled frames of the respective digital video,
applying the object approximation algorithm to frames of the respective digital video that lie between the sampled frames of the respective digital video, to approximately detect objects appearing in those frames that lie between the sampled frames of the respective digital video, and
for each of the frames that lie between the sampled frames of the respective digital video, comparing the approximate detection by the object approximation algorithm and the detection by the object detection algorithm, to estimate an accuracy of the approximate detection by the object approximation algorithm,
extracting features from frames of the respective digital video; and
training the regression model based on the estimated accuracy and the extracted features.

3. The method according to claim 2, wherein the provided digital video and the digital videos of the training set are of a same genre.

4. The method according to claim 1, wherein the threshold is determined according to a budget of computing resources that is available to operate the object detection algorithm.

5. The method according to claim 1, wherein the object approximation algorithm is selected from the group consisting of: a tracking-based algorithm, an interpolation-based algorithm, an extrapolation-based algorithm, a duplication-based algorithm, and an Artificial Neural Network (ANN)-based algorithm.

6. The method according to claim 1, executed on at least one hardware processor.

7. A system comprising:
(i) at least one hardware processor; and
(ii) a non-transitory computer-readable storage medium having program code embodied therewith, the program code executable by said at least one hardware processor to:
(a) sample a provided digital video, to obtain a set of sampled frames;
(b) apply an object detection algorithm to the sampled frames, to detect objects appearing in the sampled frames;
(c) based on the detections in the sampled frames, apply an object approximation algorithm to each sequence of frames that lie between the sampled frames, to approximately detect objects appearing in each of the sequences;
(d) apply a trained regression model to each of the sequences, to estimate a quality of the approximate detection of objects in the respective sequence by the object approximation algorithm;
(e) apply the object detection algorithm to one or more frames in those of the sequences whose quality of the approximate detection is below a threshold, to detect objects appearing in those frames;
(f) define multiple sub-sequences that are different from the sequences, wherein each of the multiple sub-sequences comprises frames that lie between every adjacent pair of frames to which the object detection algorithm has been applied in steps (b) and (e); and
(g) re-apply the object approximation algorithm to each of the multiple sub-sequences.

8. The system according to claim 7, wherein the program code is further executable by said at least one hardware processor to:
obtain a training set of digital videos;
for each of the digital videos of the training set:
apply the object detection algorithm to all frames of the respective digital video, to detect objects appearing in the frames of the respective digital video,
sample the respective digital video, to obtain a set of sampled frames of the respective digital video,
apply the object approximation algorithm to frames of the respective digital video that lie between the sampled frames of the respective digital video, to approximately detect objects appearing in those frames that lie between the sampled frames of the respective digital video, and
for each of the frames that lie between the sampled frames of the respective digital video, compare the approximate detection by the object approximation algorithm and the detection by the object detection algorithm, to estimate an accuracy of the approximate detection by the object approximation algorithm,
extract features from frames of the respective digital video; and
train the regression model based on the estimated accuracy and the extracted features.

9. The system according to claim 8, wherein the provided digital video and the digital videos of the training set are of a same genre.

10. The system according to claim 7, wherein the threshold is determined according to a budget of computing resources that is available to operate the object detection algorithm.

11. The system according to claim 7, wherein the object approximation algorithm is selected from the group consisting of: a tracking-based algorithm, an interpolation-based algorithm, an extrapolation-based algorithm, a duplication-based algorithm, and an Artificial Neural Network (ANN)-based algorithm.

12. A computer program product comprising a non-transitory computer-readable storage medium having program code embodied therewith, the program code executable by at least one hardware processor to:
(a) sample a provided digital video, to obtain a set of sampled frames;
(b) apply an object detection algorithm to the sampled frames, to detect objects appearing in the sampled frames;
(c) based on the detections in the sampled frames, apply an object approximation algorithm to each sequence of frames that lie between the sampled frames, to approximately detect objects appearing in each of the sequences;
(d) apply a trained regression model to each of the sequences, to estimate a quality of the approximate detection of objects in the respective sequence by the object approximation algorithm;
(e) apply the object detection algorithm to one or more frames in those of the sequences whose quality of the approximate detection is below a threshold, to detect objects appearing in those frames;

(f) define multiple sub-sequences that are different from the sequences, wherein each of the multiple sub-sequences comprises frames that lie between every adjacent pair of frames to which the object detection algorithm has been applied in steps (b) and (e); and (g) re-apply the object approximation algorithm to each of the multiple sub-sequences.

13. The computer program product according to claim 12, wherein the program code is further executable by said at least one hardware processor to:

obtain a training set of digital videos;

for each of the digital videos of the training set:

apply the object detection algorithm to all frames of the respective digital video, to detect objects appearing in the frames of the respective digital video, sample the respective digital video, to obtain a set of sampled frames of the respective digital video, apply the object approximation algorithm to frames of the respective digital video that lie between the sampled frames of the respective digital video, to approximately detect objects appearing in those frames that lie between the sampled frames of the respective digital video, and for each of the frames that lie between the sampled frames of the respective digital video, compare the approximate detection by the object approximation algorithm and the detection by the object detection algorithm, to estimate an accuracy of the approximate detection by the object approximation algorithm, extract features from frames of the respective digital video; and train the regression model based on the estimated accuracy and the extracted features.

14. The computer program product according to claim 13, wherein the provided digital video and the digital videos of the training set are of a same genre.

15. The computer program product according to claim 12, wherein the threshold is determined according to a budget of computing resources that is available to operate the object detection algorithm.

16. The computer program product according to claim 12, wherein the object approximation algorithm is selected from the group consisting of: a tracking-based algorithm, an interpolation-based algorithm, an extrapolation-based algorithm, a duplication-based algorithm, and an Artificial Neural Network (ANN)-based algorithm.

* * * * *